United States Patent [19]

Tibor

[11] Patent Number: 5,801,761
[45] Date of Patent: *Sep. 1, 1998

[54] METHOD AND APPARATUS FOR PRODUCING THREE-DIMENSIONAL PICTURE

[76] Inventor: Balogh Tibor, Ady Endre ÚT 8., H-1191 Budapest, Hungary

[*] Notice: This patent issued on a continued prosecution application filed under 37 CFR 1.53(d), and is subject to the twenty year patent term provisions of 35 U.S.C. 154(a)(2).

[21] Appl. No.: 525,724

[22] PCT Filed: Mar. 26, 1993

[86] PCT No.: PCT/HU93/00018

§ 371 Date: Sep. 25, 1995

§ 102(e) Date: Sep. 25, 1995

[87] PCT Pub. No.: WO94/23541

PCT Pub. Date: Oct. 13, 1994

[51] Int. Cl.⁶ .................................................. H04N 13/00
[52] U.S. Cl. ............................ 348/51; 359/458; 348/59
[58] Field of Search ........................... 348/42, 40, 43, 348/41, 44, 54, 51, 59; 359/458, 462, 471

[56] References Cited

U.S. PATENT DOCUMENTS

| | | |
|---|---|---|
| 3,566,021 | 2/1971 | Jakes .................................... 348/40 |
| 4,799,103 | 1/1989 | Muckerheide ........................ 348/51 |
| 4,829,365 | 5/1989 | Eichenlaub .......................... 348/54 |
| 5,132,839 | 7/1992 | Travis ................................ 359/462 |
| 5,253,073 | 10/1993 | Crowley ............................. 348/41 |

FOREIGN PATENT DOCUMENTS 0 473 343  3/1992  European Pat. Off. .

*Primary Examiner*—Amelia Au
*Attorney, Agent, or Firm*—Finnegan, Henderson, Farabow, Garrett & Dunner, L.L.P.

[57] ABSTRACT

The three-dimensional television set comprises a closed apparatus (12) with a 3D video signal input and/or arial input, and a laser source (22), a modulator (24) and a deflecting system (30) arranged in the closed apparatus (12), and a light emitting surface (40) at the front face of the closed apparatus (12), said deflecting system (30) providing deflection of laser beam produced by said laser source (22) into pixels (42) of said light emitting surface (40), and a further deflection to direct laser ray emitted from said pixels (42) to various directions ($i_1, i_2 \ldots i_n$) defining a three-dimensional field of view, under control of synchronizing signal corresponding to direction information of a 3D video signal.

13 Claims, 13 Drawing Sheets

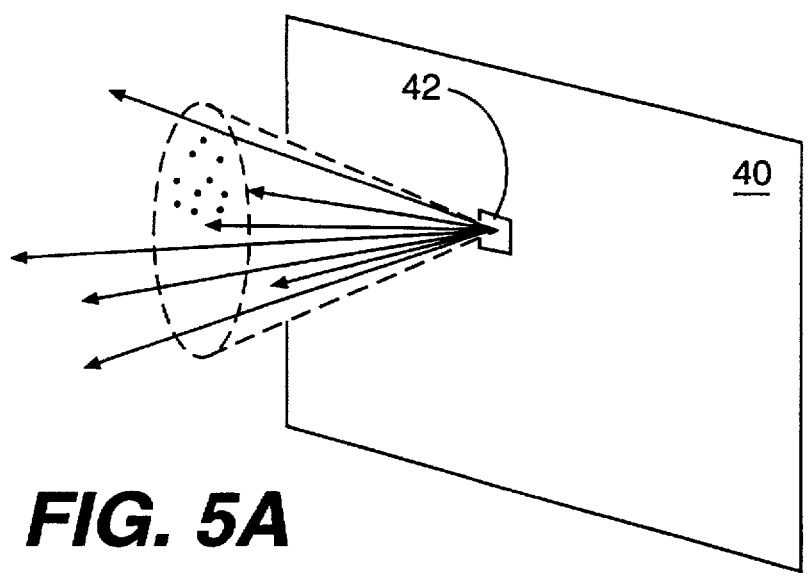
FIG. 5A
FIG. 5B
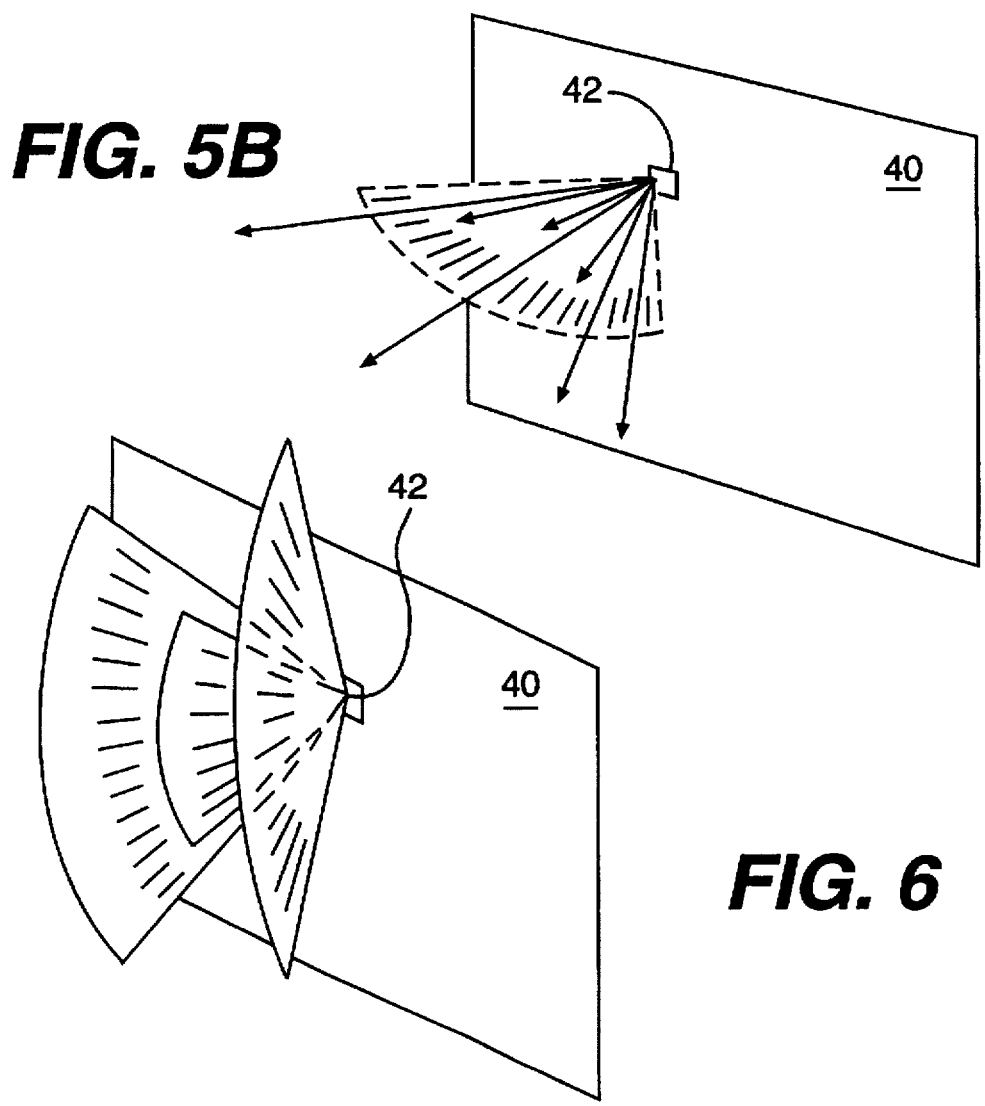
FIG. 6

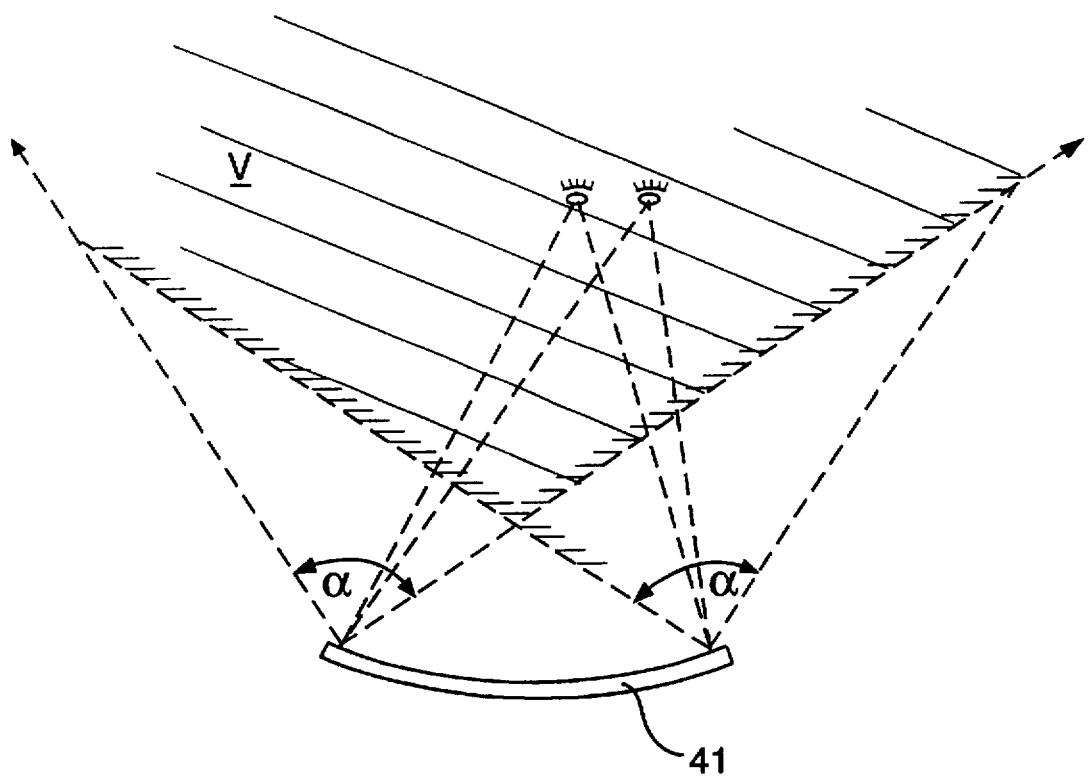
FIG. 16
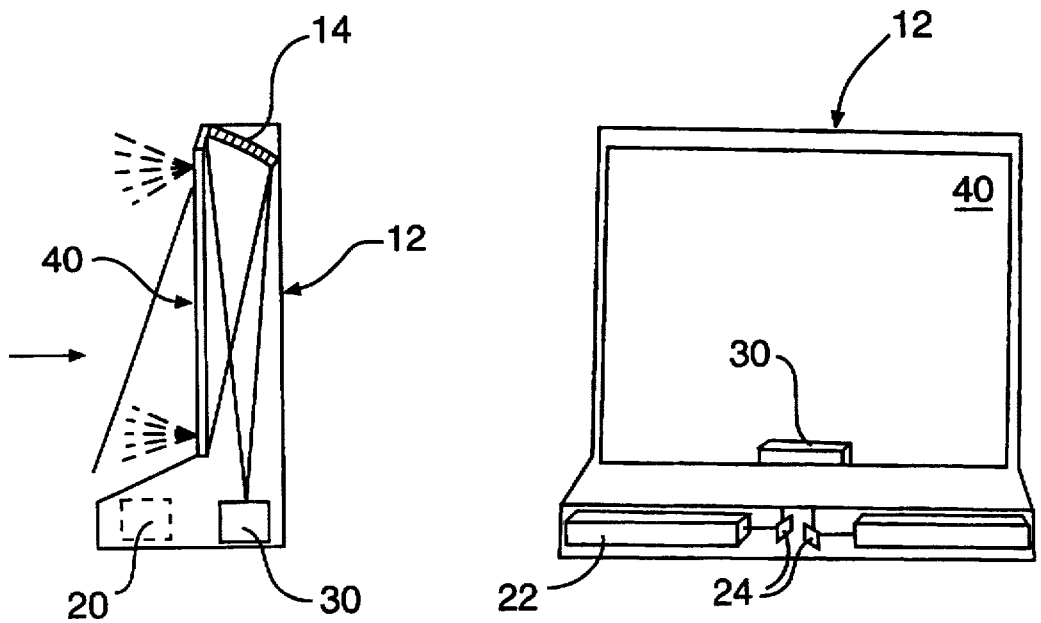
FIG. 18A  FIG. 18B

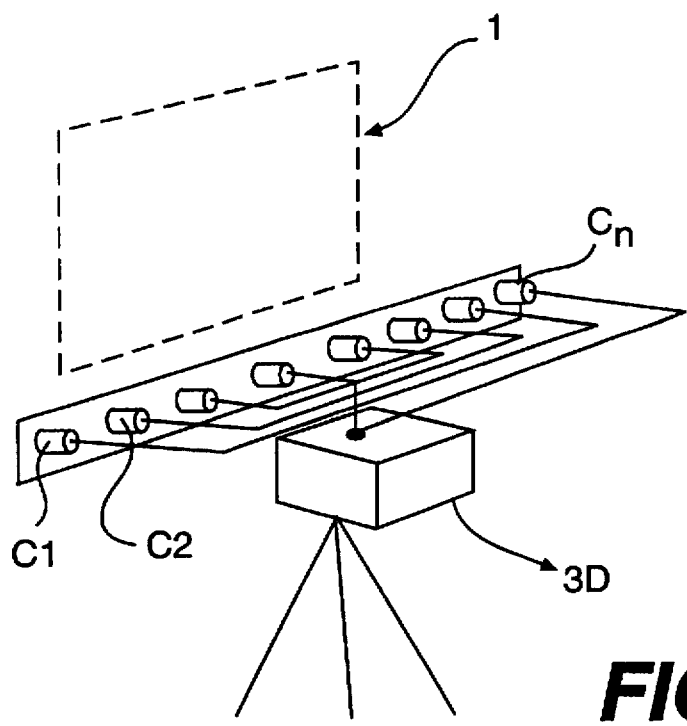
FIG. 19A
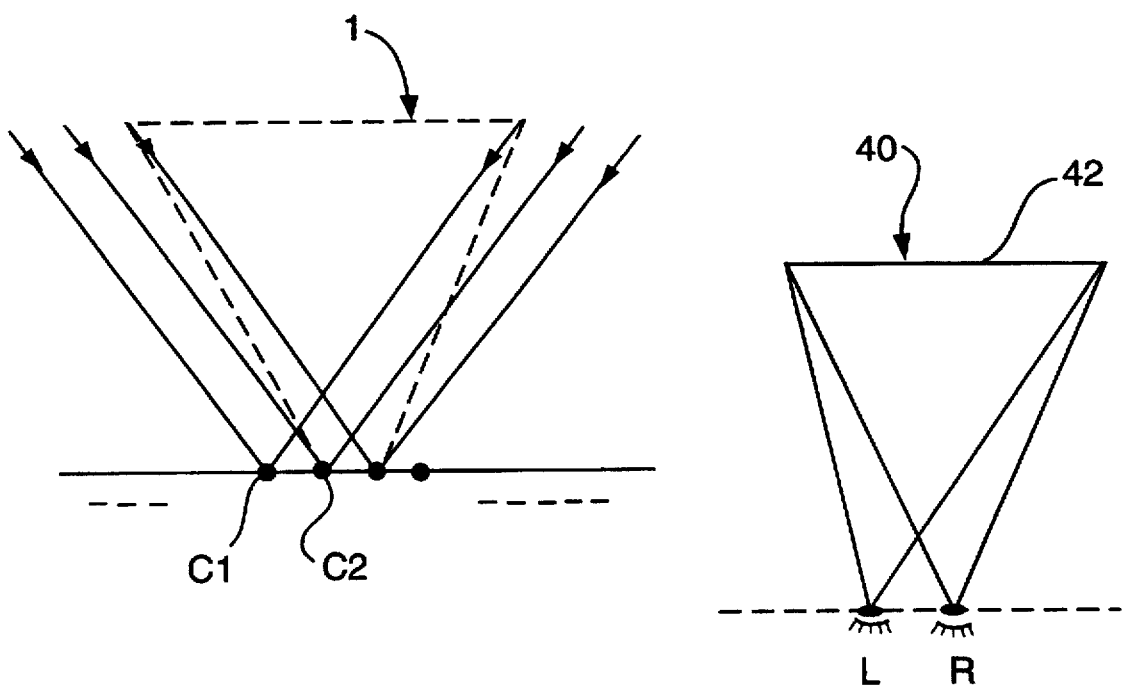
FIG. 19B
FIG. 19C

METHOD AND APPARATUS FOR PRODUCING THREE-DIMENSIONAL PICTURE

BACKGROUND OF THE INVENTION

1. Technical Field

The invention relates to a method and apparatus for producing three-dimensional picture, in particular to a three-dimensional television receiving system. The invention is also useful for other purposes, such as industrial planning and design.

2. Summary of the Prior Art

Video signals are recorded electronically or by other means, and may be displayed through a television system. The television receiver converts incoming television (video) signals into the original scenes or figures along with the associated sounds. The known two-dimensional television receivers comprise a picture tube having plane or arched fluorescent screen, producing a planar image by varying the electron-beam intensity as the beam, emitted by an electron gun, is deflected from side to side and up and down to scan a raster on the fluorescent screen at the other end of the tube. The fluorescent screen realizes a definite raster of segments, known as picture points or picture elements, arranged in scanning lines. The picture elements of the fluorescent screen are scanned point to point after each other by the electron beam, as the electron beam is moved by controlled horizontal and vertical deflection.

The issue of displaying true 3D scenes is not yet solved properly up-to-date. According to the present state of television technique 3D image reconstruction is exhausted at the level of displaying stereoscopic or autostereoscopic images. In these systems the three-dimensional effect is based on the deception of human perception (e.g. using special glasses) causing bad physiological effect. There are experimental systems which employ lenticular-lenses. By principle, these systems realize a resticted field of view and poor resolution.

A widely used method of three-dimensional optical image formation is the holography, a technique for recording and later reconstructing the amplitude and phase distributions of a wave disturbance. In optical image formation, the technique is accomplished by recording on a special photographic plate the pattern of interference between coherent light reflected from the object figure, and light coming directly from the same source or being reflected from a mirror. When the special photographic plate, known as hologram is developed and illuminated from behind by a coherent laser beam, it produces a three-dimensional image in space. Holography, however, is not a practical technique for producing three-dimensional picture from video signals.

OBJECTS OF THE INVENTION

An object of the invention is to provide a method which enables receiving three-dimensional video signals and producing real three-dimensional picture from them.

A further object is to develop an apparatus to realize the above method, i.e. an apparatus producing three-dimensional picture from the received 3D video signal, said apparatus being realizable with reasonable form and expenditure. An essential object of the invention is to achieve a three-dimensional television system by means of the suggested method and apparatus.

SUMMARY OF THE INVENTION

An essential feature of all kind of two-dimensional, planar images, e.g. paintings, photoes or picture of a usual television screen is that the intensity of light emitted or reflected from any point of the picture is independent, within a wide field of view, from the direction of the emitted or reflected light, i.e. a given picture point is the same viewed from every direction. On the other hand, a three-dimensional, spatial picture is characterized by picture points emitting or reflecting different light beams in every direction of the field of view, which means that the intensity (and colour) of a given picture point viewed from different directions depends on the viewing direction.

It has been found that a three-dimensional picture can be provided by means of a light emitting surface in which light beams are emitted from the picture points of said light emitting surface to many directions, wherein the intensity and colour of the light beam emitted from any picture point is function of the viewing direction. Said viewing directions together define a three dimensional field of view. The quality of such three dimensional picture would depend on the density of the picture points and on the number of directions defining the field of view, and also on the width of said field of view. There are two ways to achieve the above task, that is deflecting a modulated, spatially coherent light ray to get a 3D image. The one way is that the points of the light emitting surface are active light emitting elements, e.g. a Laser Diode Array, with the necessary optics and control means so that they can emit light of proper intensity and colour to the given directions in a controlled way according to a 3D video signal. According to the other way, light rays from one or more common light sources are directed to the pixels and manipulated according to the important characteristics of the light (intensity, colour and direction), at the common source or at the pixels.

Set out from the above recognition, one method according to the invention comprises the steps of:

modulating the intensity of a spatially coherent light ray, preferably a laser ray by a 3D video signal (video signal containing three-dimensional picture information), directing the modulated laser ray by controlled deflection into pixels defining a light emitting surface, and deflecting the modulated laser ray to be emitted from every pixel of the light emitting surface to a number of directions, said directions defining a given field of view, the intensity of said laser ray components emitted from said pixels in various directions of the field of view corresponding to the direction information of the concerning direction of the 3D video signal.

According to the invention the laser ray modulated with the 3D video signal containing intensity and colour information is directed to the picture points (pixels) in a defined order, which order is preferably controlled by the synchronizing components of said 3D video signal. The light ray emitted from any pixel to any direction has an intensity and colour corresponding to the intensity and colour information of the 3D video signal component associated with said pixel and said direction.

The coordinates of an emitted laser ray is defined as a result of the horizontal, vertical and viewdirectional deflections.

Basicly there are two modes of achieving the above deflections of modulated laser ray according to picture points and directions.

The one mode is deflecting the laser ray according to said directions before reaching the pixels so that the incident components of laser ray striking into the pixels are deflected in angle of arrival or displaced parallel in association with the direction they belong to. The further deflection shall be achieved without any further controlled step, preferably by use of passive optical means.

According to the other mode of deflecting the laser ray strikes into the pixels without being deflected according to the view directions, and is deflected and emitted through active, controlled optical elements placed in the pixels to said various directions defining said field of view.

The modulated laser can be directed into said pixels by means of mechanical or acousto-optical deflecting means controlled in accordance with said directions of the field of view, too, wherein said mechanical or acousto-optical deflection is preferably controlled by horizontal and vertical deflection information contained in the synchorinizing component of said 3D video signal.

Preferably, the modulated laser ray is directed into said pixels by use of horizontal and vertical (frame) deflection according to TV standards, said pixels being arranged so that their configuration conforms with the standard TV picture point configuration.

In an advantageous practical mode of realizing the invention a laser beam is modulated by a 3D video signal having no vertical parallax information content, wherein said laser beam emitted from a pixel horizontally sweeps along said field of view, said laser beam having a definite vertical dispersion. Since the human eyes are normally in the same horizontal plane, omitting the vertical parallax does not mean practically any essential loss of quality in the three-dimensional view.

The modulated laser ray striking into said pixels preferably holographic/diffractive can be deflected and directed through holographic diffractive optical elements or through periodical spheric-symmetrical optical elements to the directions of the field of view.

According to the invention the modulated laser ray can be achieved by direct modulation of a laser source with said 3D video signal.

The modulated laser ray can also be achieved by modulating an acousto-optical crystal through which the laser ray passes by said 3D video signal.

A sufficiently wide spatial view can be achieved by realizing a field of view of 30° to 150°, wherein the number of said various directions defining
said field of view is 30 to 150, which presumes a horizontal dispersion of emitted light beam of about 1°. Our experiments show that three-dimensional spatial picture of satisfactory quality is achieved even with a horizontal viewing field of 30 to 40 degrees, and view direction steps of 1 to 3 degrees. As mentioned above, the vertical parallax of the three-dimensional view can be omitted. In this case the laser beam of any horizontal direction should have an appropriate vertical dispersion, which can be achieved by using e.g. holographic or vertical cylindric-symmetrical optics combined with one dimensional dispersion elements.

According to the invention colour three-dimensional picture can be produced by modulating a multicoloured laser beam or more laser rays, preferably three laser rays of different basic wavelength (red, green and blue), deflecting and directing them into said pixels, and directing a modulated laser beam containing said three laser rays of different basic wavelength from each pixel to each direction of said field of view.

Three dimensional moving picture may be achieved according to the invention by a definite number, preferably at least twenty picture repetitions per seconds.

The bandwidth of the 3D video signal can be reduced if necessary by use of any data- or information-compressing process. Such processes are known per se so the don't need further discussion.

The 3D video signal by which the laser beam is modulated can be produced e.g. so that 2D images of a spatial scene or figure are taken simultaneously from each of said directions defining said field of view by means of appropriate TV or video cameras, advantageously a multielement CCD camera containing a corresponding number of CCD chips, and the 2D signals recording the different view images are composed to consitute a 3D video signal format. The signal components associated with the different picture points and various view directions are ordered in a defined time sequence. Other means for recording a 3D video signal are known per se.

According to another way, the problem of producing three-dimensional picture can also be solved by controlling spatially coherent elementary light sources, such as CSD or monolithic surface-emitting laser diode arrays, or preferably elementary laser sources, arranged to constitute a light emitting surface, so that each of the elementary light sources is controlled according to the corresponding view direction information of a 3D video signal, wherein said view directions define a given field of view.

In this case preferably each of said elementary light sources is associated with one of said view directions, and controlled according to the one direction it belongs to. The light rays emitted by said elementary light sources are directed to the view direction the corresponding elementary light source belongs to, by use of optical means integrated in the pixels of said light emitting surface.

The elementary laser sources can also be simultaneously controlled in combination with each other according to holographic patterns, so that the laser beams sent to said view directions are achieved by the interference of coherent light waves emitted by the elementary laser sources.

In order to reduce the sharp resolution requirements of the deflection system used in carrying out of the invention, a further method is suggested, employing a light beam comprising independently controllable coherent light rays; The suggested method comprises the steps of:

modulating a coherent light beam, preferably a laser beam by a 3D video signal, wherein the modulated light beam should contain light rays each associated with a view direction, said view directions defining a given field of view, said light rays of the beam being modulated simulaneously, each light ray according to its associated view direction, directing said modulated coherent light beam into pixels arranged to define a light emitting surface, and emitting each component of the modulated coherent light beam from the pixels to the direction said component (light ray) is associated with.

The invention also relates to an apparatus for producing three-dimensional picture. The apparatus according to the invention comprises:

a spatially coherent light source, preferably laser source;

a modulator to modulate laser ray produced by said light source, said modulator controlled by a 3D video signal;

a deflecting sysem to deflect modulated laser ray, controlled by the synchronizing signal of the 3D video signal;

a light emitting surface composed of pixels of definite mutual arrangement; and optical elements adjusted in said pixels of the light emitting surface to deflect when transmitting or reflecting incident laser ray from the pixels to various directions, said directions defining a given field of view, wherein said deflecting system is controlled to deflect laser ray in accordance with said directions of the field of view into said pixels.

Preferably, the pixels constituting the light emitting surface are arranged in conformity with the picture point configuration of a standard TV screen, and said deflection system comprises horizontal and vertical deflection units controlled by the line synchronizing signal and frame synchronizing signal, respectively, of the 3D video signal. The vertical deflection unit and the horizontal deflection unit can comprise e.g. acousto-optical crystals controlled by voltage-controlled oscillators.

The deflecting system may involve acousto-optical elements controlled in accordance with the directions of said field of view. The optical elements can also be passive elements of pre-defined horizontal deflection characteristic and definite vertical dispersion, preferably cylindric-optical elements, holographic optical elements etc., said holographic optical elements having vertical focus line, and light dispersing in vertical planes involving said vertical focus line. In the latter case, when the optical elements in the pixels are passive ones, the deflecting system provides that the laser ray arriving the pixels is deflected according to the various directions. The deflection range of said deflection system should correspond to the number and width of said optical elements adjusted in said pixels.

In a preferred apparatus according to the invention the deflection system comprises fibreglass groups, one for each pixel, said fibreglass groups each having a number of fibreglasses, which number is equal to the number of various directions defining said field of view, the input end of said fibreglass groups being attached to the output of a unit deflecting said modulated laser ray in accordance with the pixels, the other end of said fibreglass groups being attached to the concerning one of said pixels, the end sections of the fibreglasses of said groups being adjusted to direct laser ray to the very direction associated with the corresponding one of said fibreglasses. Each fibreglass of a group transmits a component of the modulated laser beam, which component is associated with the view direction said fibreglass belongs to.

In a further preferred embodiment of the invention the laser source and said modulator are realized in a laser unit comprising laser diode controlled by said 3D video signal. A more practical construction can be achieved by integrating said laser source, modulator and deflection system in an integrated optical unit.

In a preferred embodiment of the invention the laser source is directed to an acousto-optical modulator crystal which is controlled by said 3D video signal through a signal forming unit.

The apparatus according to the invention can be appropriate to reproduce colour spatial image, in which case it comprises multicolour laser sources or more, e.g. three laser sources of different basic wavelength. Either there is one optical element in each pixel and electronically copmensated deflection applied, or there are three optical elements arranged in each pixel to deflect or transmit the incident laser ray of corresponding wavelength to the various directions defining said field of view.

A further preferred embodiment of the invention comprises:
control means for receiving 3D video signal,
a light emitting surface constituted by pixels,
spatially coherent elementary light sources, e.g. CSD-s or elementary lasers (e.g.) MSELDA arranged in said pixels, to emit coherent light rays of appropriate direction-related intensity to directions defining a given field of view.

In a preferred embodiment of the above apparatus each of said elementary lasers is associated with at least one of said directions defining said field of view. This feature can also be achieved so that there are optical elements adjusted in said pixels of the light emitting surface, each of said optical elements directing the laser ray emitted by one of said elementary lasers to the direction said elementary laser is associated with.

In another preferred embodiment the distances between adjacent elementary lasers are in order of magnitude of the light wavelength, so that the laser rays emitted by said elementary lasers interfere with each other in accordance with a holographic control of the whole set of said elementary lasers.

The apparatus according to the invention can realize a three-dimensional television receiver or video or computer monitor comprising a closed receiver apparatus having 3D video input and/or arial input, wherein said laser sources, modulator an deflecting system are placed in the bottom part of the closed apparatus, said light emitting surface is arranged along the front face of the closed apparatus, and said deflecting system is connected with the optical elements of said light emitting surface through focusing scanner mirror optics arranged behind the light emitting surface, inside of said closed apparatus.

BRIEF DESCRIPTION OF THE DRAWINGS

The invention is illustrated hereinafter with reference to the accompanying drawings in which:

FIGS. 5A and 5B are schematic diagrams illustrating the function mode of a pixel of the light emitting surface, in case of providing and not providing vertical parallax, respectively;

FIG. 6 is a schematic diagram illustrating the function mode of a preferred embodiment of the invention, providing no parallax, and the laser beam emitted from a pixel of the light emitting surface having a definite dispersion in vertical plane;

FIG. 16 is a schematic top view of an arcuate light emitting surface, providing a wider three dimensional visual field;

FIGS. 18A and 18B are schematic side sectional and front sectional views, respectively, of a three-dimensional television receiver set according to the invention;

FIG. 19a is a schematical view of an apparatus for recording 3D video signal;

FIG. 19b is a schematic plan view illustrating the function of the apparatus for recording 3D video signal;

FIG. 19c is a schematic plan view illustrating a display arrangement for displaying the recorded 3D video signal;

DETAILED DESCRIPTION OF THE DRAWINGS

Figure 1:
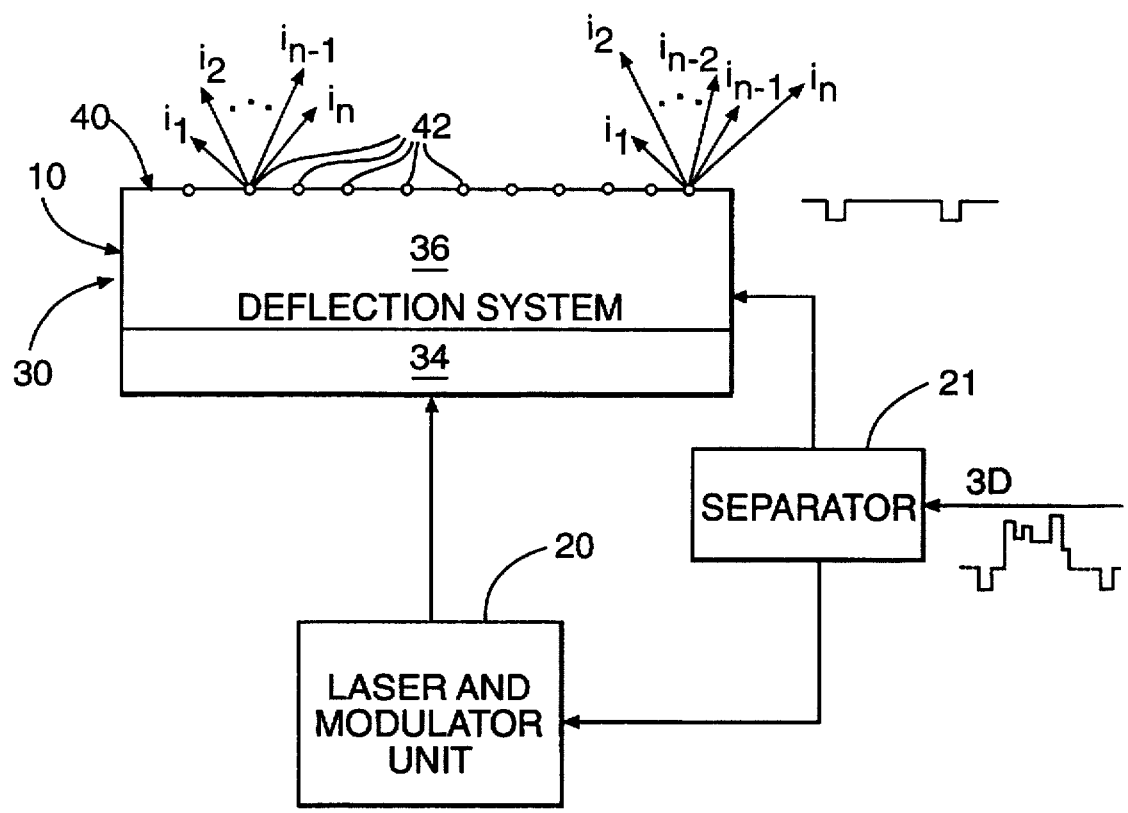
FIG. 1 is a block diagram of a system illustrating a way of carrying out of the invention.

Referring first to FIG. 1, an apparatus 10 for carrying out the invention comprises a laser and modulator unit 20, a separator unit 21, a deflection system 30 and a light emitting surface 40 having pixels 42 arranged in a defined configuration. The input signal is a 3D video signal which is separated by separator unit 21 to luminescence and colour signal component and synchronizing signal component. The synchronizing signals are applied to the control input of the deflection system 30, while the luminescence and colour signals control the laser and modulator unit 20, modulating a laser beam according to the three-dimensional picture information. From the output of laser and modulator unit 20 a modulated laser beam is applied to a deflection means 34 which directs the incoming laser beam by controlled deflection into the pixels 42 of the light emitting surface 40, into each pixel 42 subsequently after each other.

The deflection system also comprises deflection means 36 providing a time controlled deflection of the laser beam arriving in the pixels 42 to various directions $i_1, i_2 \ldots i_n$ of a given field of view. An essential feature of the invention is that the pixels 42 of the light emitting surface should emit laser beam to each direction with corresponding intensity and colour, in contrast with the two-dimensional screen, where the intensity and colour of the light emitted from any picture point is direction invarious.

Figure 1A:
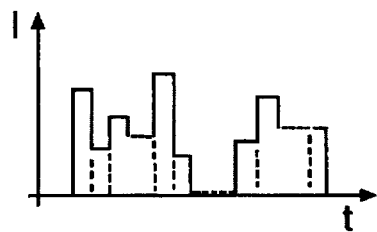
FIG. 1A is a light intensity diagram of a laser beam modulated by the luminescence signal component of a 3D video signal.
Figure 1B:
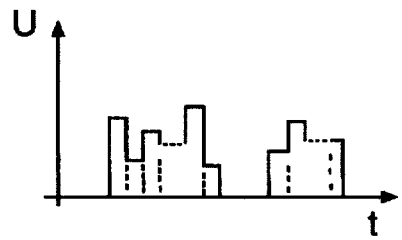
FIG. 1B is a voltage diagram of the luminescence signal component of a 3D video signal modulating a laser beam in the system of FIG. 1.

In order to achieve laser beam emission of direction various intensity it is necessary to have the laser beam modulated corresponding to various directions and have a deflection controlled in accordance with those directions. As illustrated in FIG. 1A and 1B, respectively, the luminescence signal component of a 3D video signal, and so the modulated laser signal have time sections corresponding to the various picture points, i.e. pixels 42, and each section corresponding to any of the pixels has subsections, each associated with one of the directions $i_1, i_2 \ldots i_n$.

Figure 20A:
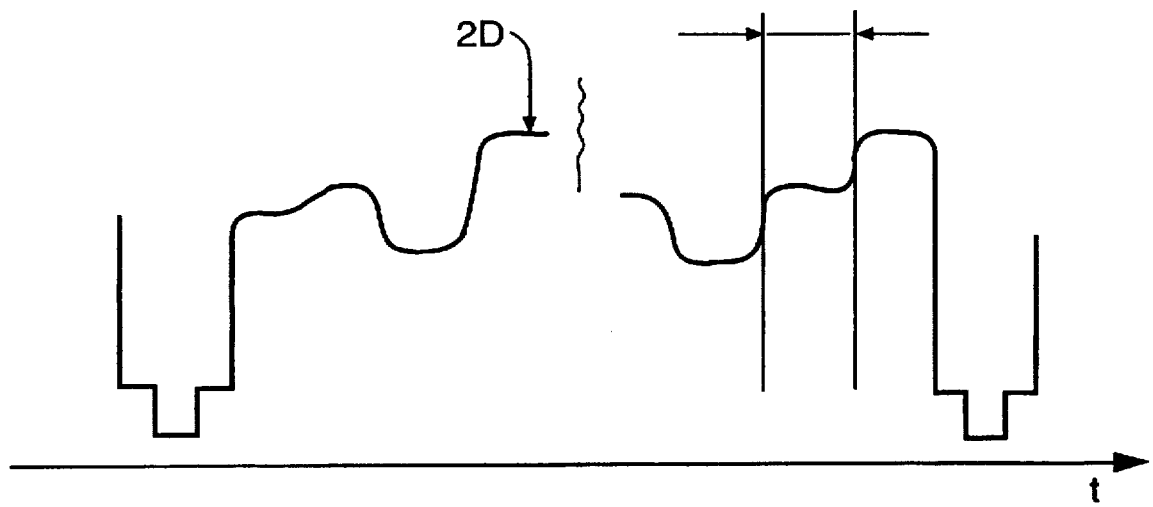
FIGS. 20a and 20b are intensity diagrams of a two-dimensional and three-dimensional video signal, respectively.
Figure 20B:
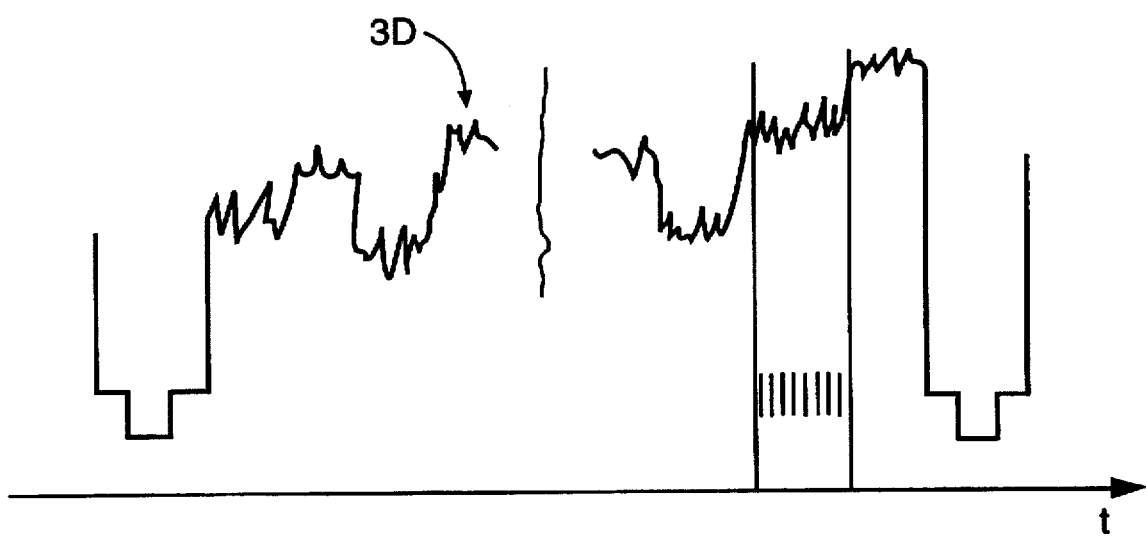

For comparison purposes, FIGS. 20a and 20b illustrate a two-dimensional and a three-dimensional video signal, respectively. As seen in the figures, the 2D video signal is substantially constant within a section interval corresponding to a picture element, while the 3D video signal comprises subsections of different amplitude even within one section interval, each of said subsections corresponding to a definite view direction.

Figure 2:
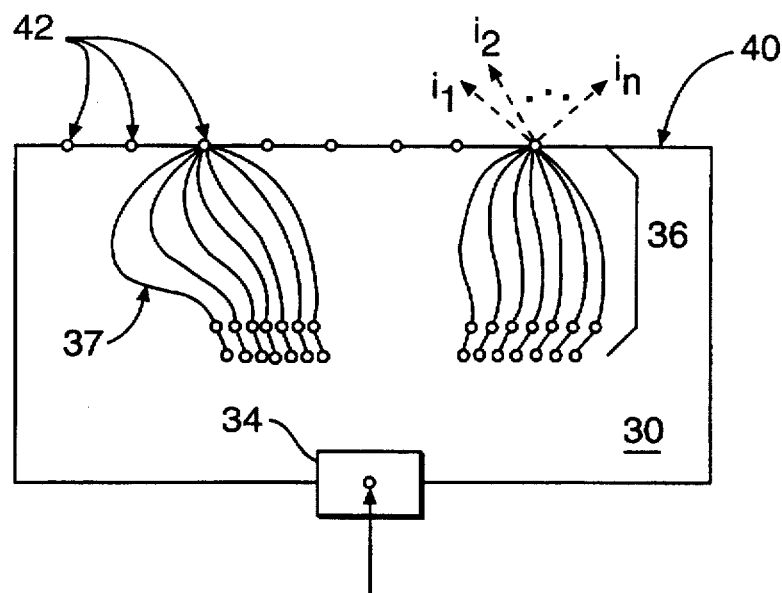
FIG. 2 is a schematic diagram of a preferred embodiment of the invention.

In the embodiment of FIG. 2 the deflection system 30 comprises deflection means 36 composed of fibreglass-groups 37. Each pixel 42 is associated with one of the fibreglass-groups 37, each of them comprising a number of fibreglasses, which number is equal to the number n of directions $i_1, i_2 \ldots i_n$. The modulated laser beam applied to the deflection means 34 is forwarded to the input and of said fibreglass-groups 37 so that each section of the modulated laser beam corresponding to one of the pixels 42 arrives at the input of the fibreglass-group 37 which is associated with that of pixels 42. The end sections of the fibreglasses are arranged so that the laser beam emitted from the fibreglasses, that is emitted from the pixel is directed to the corresponding one of directions $i_1, i_2 \ldots i_n$. If necessary, a correcting optical deflection can be employed in the pixels 42, in order to exactly meet the defined directions $i_1, i_2 \ldots i_n$.

Figure 3:
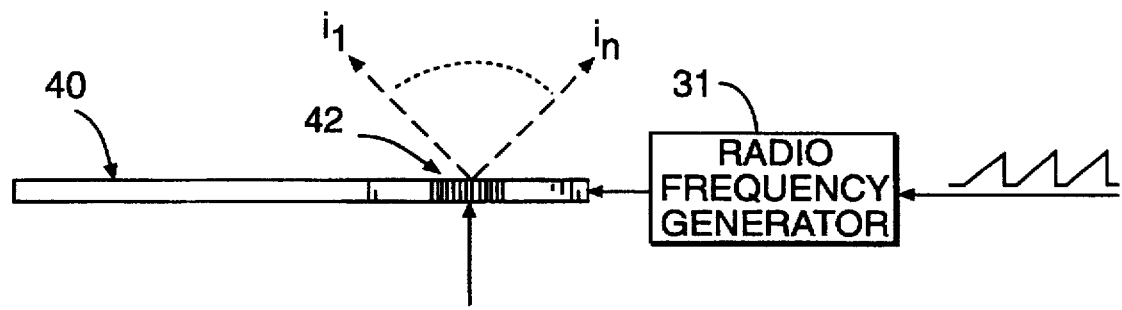
FIG. 3 is a schematic diagram of an embodiment of the deflection system and light emitting surface employed in a system according to the invention.

The function of the deflecting system illustrated in FIG. 3 basicly differs from the above embodiment. In this deflecting system the modulated laser beam arrives the pixels only deflected by deflection means 34, without being deflected according to the various directions $i_1, i_2 \ldots i_n$. This second deflection is carried out in the pixels 42, by means of active optical elements, preferably acousto-optical elements, controlled by a radio-frequency generator 31 corresponding to the various directions $i_1, i_2 \ldots i_n$. The input of the RF generator is driven by an appropriate saw-tooth signal.

Figure 4:
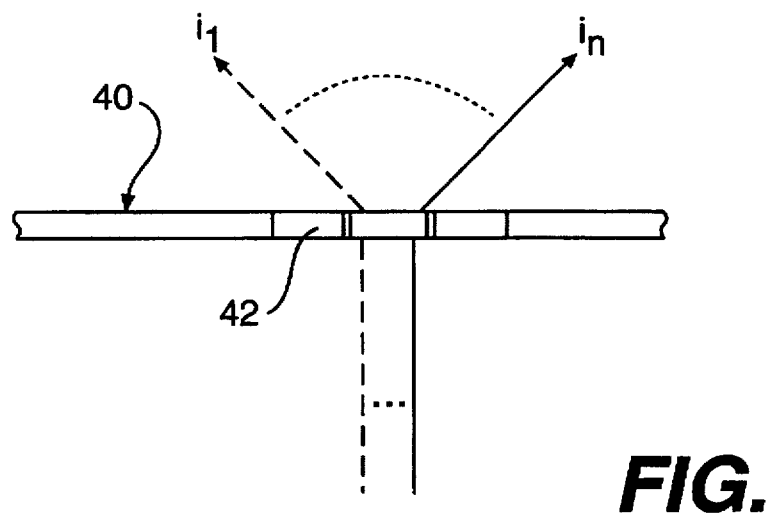
FIG. 4 is a schematic diagram illustrating the function mode of another preferred embodiment of the deflection system and light emitting surface.

FIG. 4 shows a further possible way to achieve deflection to the various directions according to the invention. Passive optical deflection elements are arranged in the pixels 42. The modulated laser beam strikes the pixels 42 parallel displaced in time, so that the subsections of the laser signal corresponding to the different directions arrive the passive optical element in the pixel 42 in a defined shift position, so that each subsection of the laser signal will be deflected by the passive optical element to the corresponding one of said directons.

FIG. 5A illustrates how the laser beam, in time sequence, is emitted from a pixel 42 to various directions defining a three-dimensional field of view, in case of producing three-dimensional picture from a 3D video signal comprising vertical parallax. For such a three-dimensional emission optical elements of spherical symmetry or holographic optical elements can be used. In the practice, however, the vertical parallax information may be omitted without significant restriction of the three-dimensional image, as illustrated in FIG. 5B. In order that the viewing height, i.e. the vertical position of the viewer's eyes be not so critical, the laser beam modulated by a 3D video signal having no vertical parallax shall be emitted to various directions of a horizontal field of view, and dispersed in vertical planes, involving said directions as shown in FIG. 6. For such purpose e.g. cylindrical optical elements or holographic optical elements are the appropriate deflection means.

Figure 7:
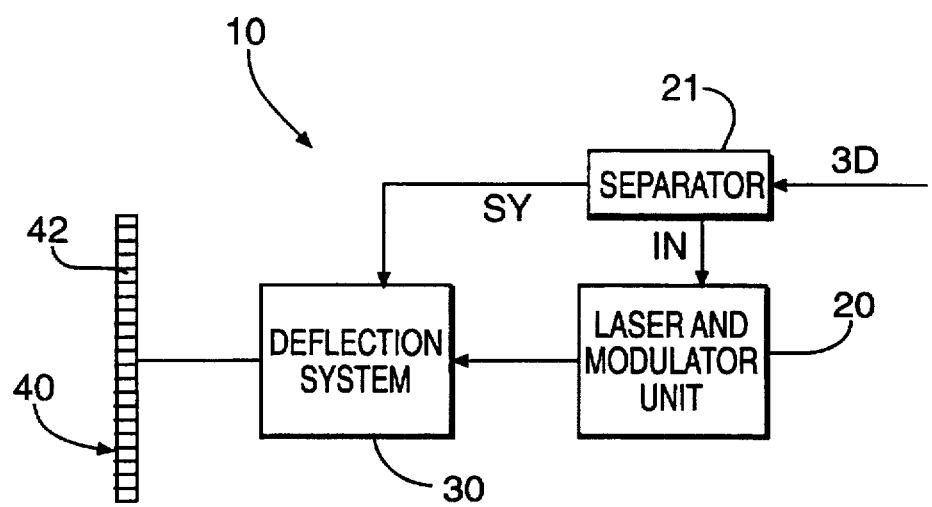
FIG. 7 is a block diagram of a further preferred embodiment of the invention.
Figure 8:
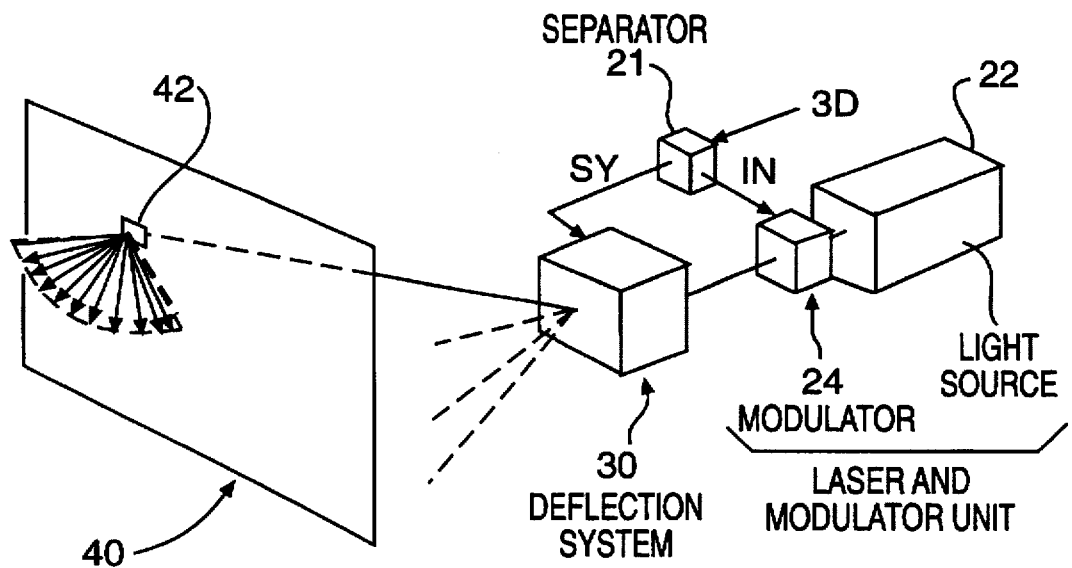
FIG. 8 is a schematic perspective view and illustration of function of the apparatus of FIG. 7.

The block diagram of FIG. 7 basicly differs from the system of FIG. 1 in that the light emitting surface 40 of FIG. 7 is a separate functional element, not part of the deflection system 30. Laser and modulator unit 20 comprises a laser source 22 and a modulator 24, as shown in FIG. 8. Modulator 24 is controlled by a luminescence and colour signal component IN of the 3D video signal. The modulated laser beam is deflected to the pixels 42 of the light emitting surface 40 and deflected or paralelly displaced corresponding to various view directions, according to a defined time sequence, by means of a deflection system 30 controlled by the synchronizing signal component SY of the 3D video signal.

Figure 9A:
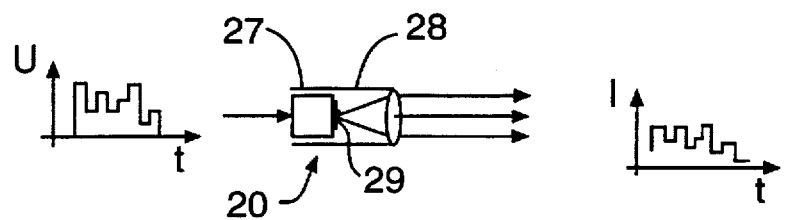
FIGS. 9A and 9B are schematic diagrams illustrating two preferred way of modulating laser ray in a system according to the invention.

FIG. 9A shows a preferred embodiment of laser and modulator unit 20, comprising an integrated unit of a semiconductor laser diode 27 and chip 29 attached to forming optics 28. The output signal is a modulated coherent laser beam, the intensity I of which being also illustrated in FIG. 9A.

Figure 9B:
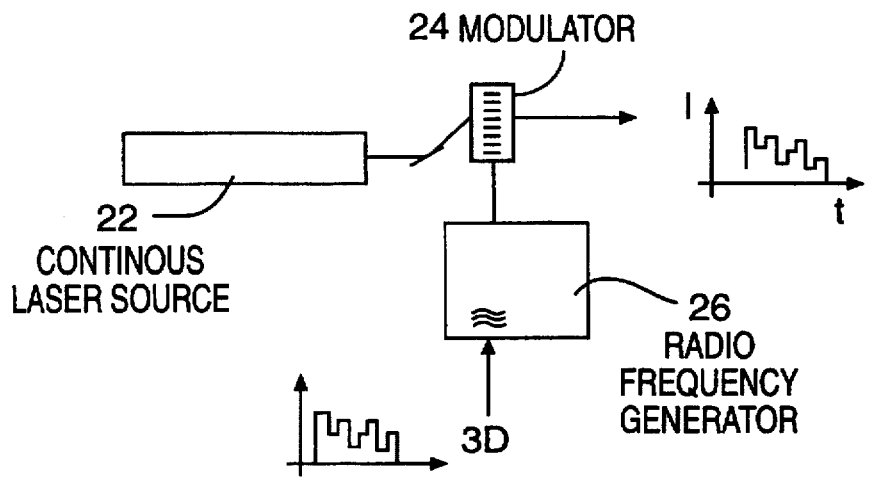

FIG. 9B illustrates another preferred way of producing modulated laser beam, wherein a continuous laser source 22 sends laser beam to a modulator 24 carried out as acousto-optical crystal controlled by a 3D video signal through a radio-frequency generator 26.

Figure 10A:
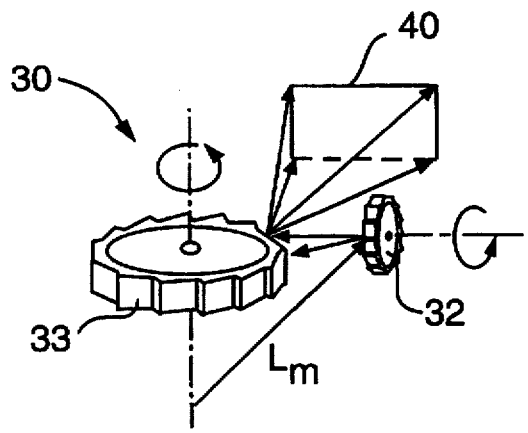
FIGS. 10A and 10B are schematic, partly block diagrams of preferred ways of carrying out the deflection of laser ray according to the invention.
Figure 10B:
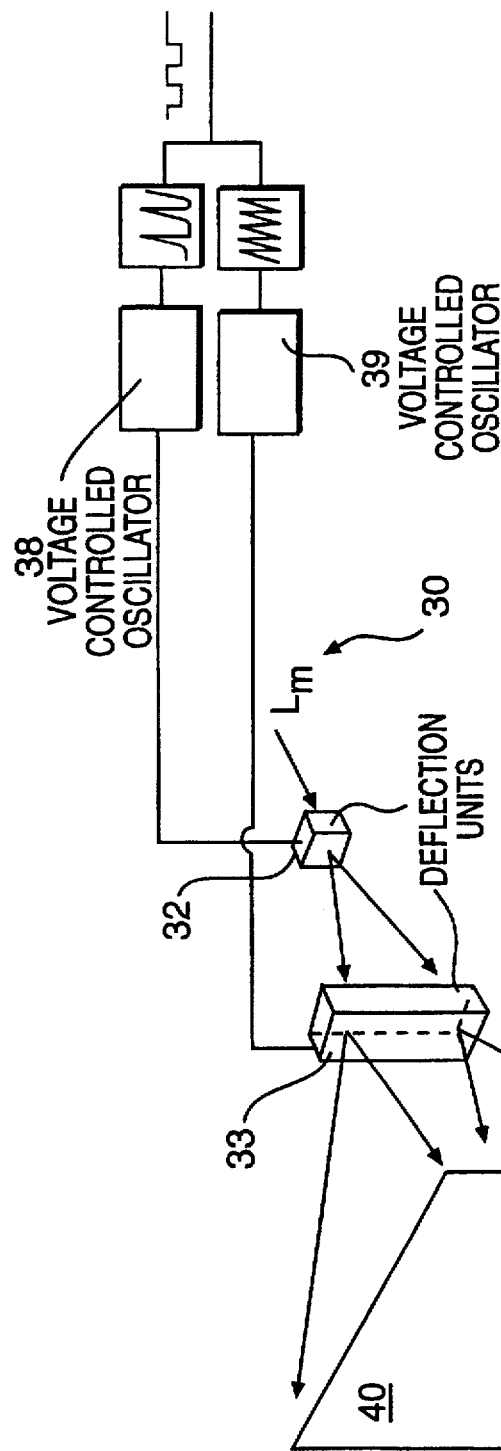

FIG. 10A and 10B show preferred embodiments of a part of deflection system 30, providing synchronized deflection of a modulated laser beam $L_m$ to pixels 42 of the light emitting surface 40, according to a prescribed time sequence. In the examples the geometrical and sequential arrangement of the pixels 42 corresponds to the picture element configuration of a standard two-dimensional television screen, so the deflection unit 34 comprises horizontal (line) deflection unit 33 and vertical (frame) deflection unit 32, similarly to the deflection system of known TV-s. In FIG. 10A deflection units 32 and 33 are polygonal mirror arrangements driven by precisely controlled motors not shown in the drawings.

In FIG. 10B the horizontal and vertical deflections are provided by acousto-optical crystals controlled by voltage-controlled oscillators 38 and 39, driven by saw-tooth generators.

Figure 11:
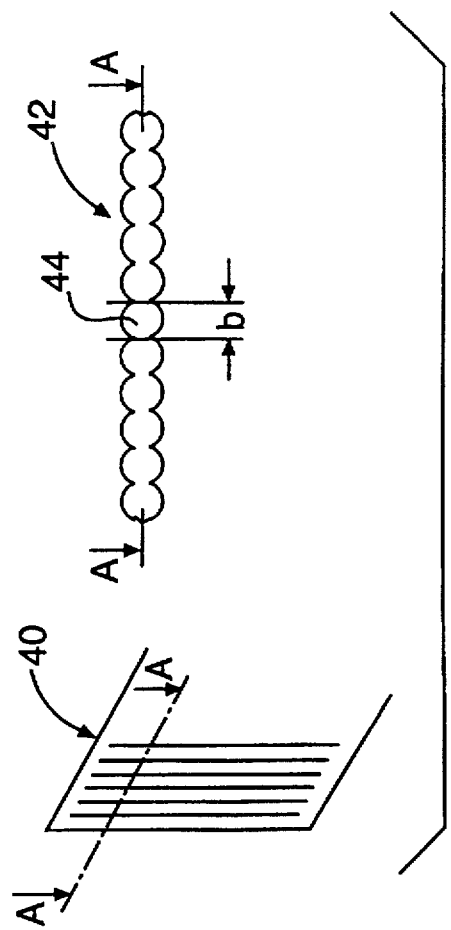
FIG. 11 is a schematic view of the preriodical cylindric optical element employed in the deflection system of an apparatus according to the invention.
Figure 12:
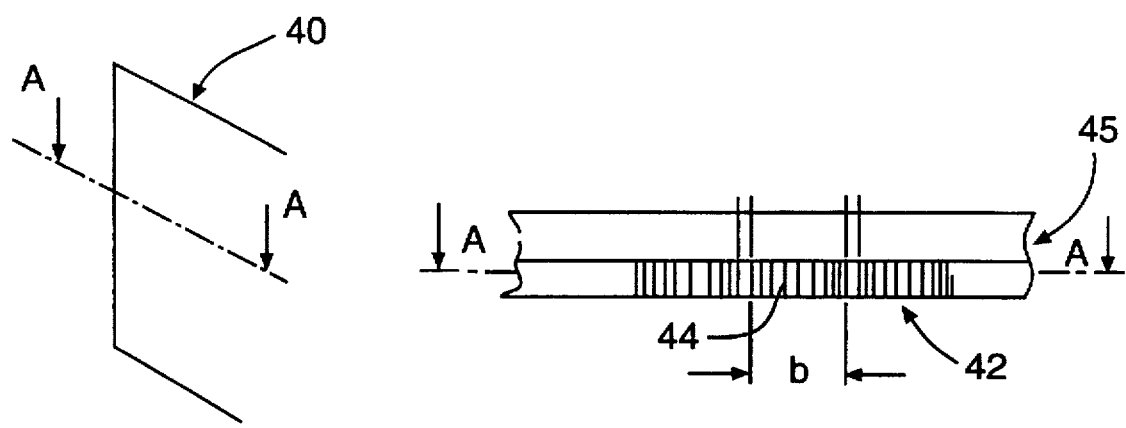
FIG. 12 is a schematic view of a holographic optical element arranged in a pixel of the light emitting surface of an embodiment of the invention.

Referring now to FIGS. 11 and 12, optical elements 44 arranged in pixels 42 of the light emitting surface 40 are shown. In FIG. 11 optical elements 44 are realized as periodical cylindric-symmetrical optics, while optical elements of FIG. 12 are holographic optics, such as transmissional relief holograms. Holographic optical elements are arranged on a planar carrier plate, preferably made out of coloured glass or plastic. In case of choosing appropriate optical elements, the whole light emitting surface 40 can be produced by a single pressing method.

Figure 13:
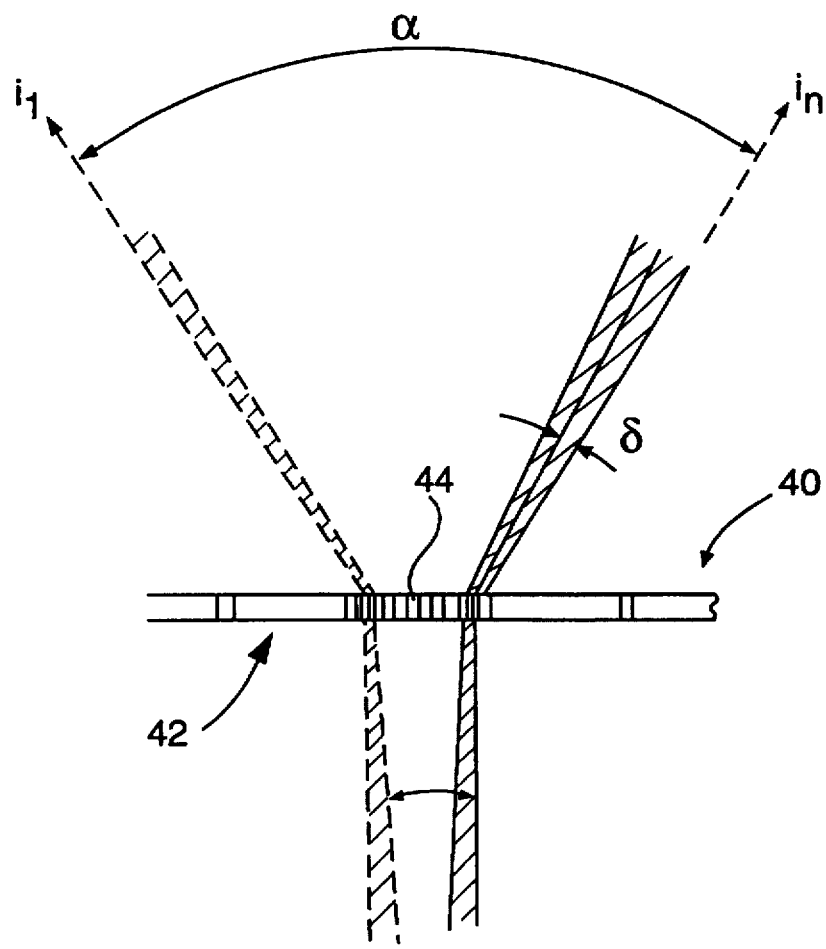
FIG. 13 is a schematic diagram illustrating the function mode of a preferred way of carrying out of the invention.

As illustrated in FIG. 13, a modulated, focused laser beam strikes a pixel 42 so that it arrives, shifted in time, at n different points of the holographic optical element 44 set in the pixel 42. The direction to which the laser beam is emitted from the pixel 42 depends on where the laser beam strikes the incidence surface of the optical element 44. As the point of incidence moves along the inner surface of the optical element 44, the direction of the emission of the laser beam changes between directions $i_1$ and $i_n$, so that the emitted laser beam sweeps along a field of view α, defined by said directions $i_1 \ldots i_n$.

In order to achieve a continuous three-dimensional image the laser beam emitted from a pixel to a defined direction shall have a defined angle of divergence δ. In a simple case for example the field of view α is equal to 90°, and there are 90 different directions $i_1, i_2 \ldots i_{90}$ within the field of view, wherein the angle of divergence δ of the emitted laser beam shall be about 1°.

Figure 14:
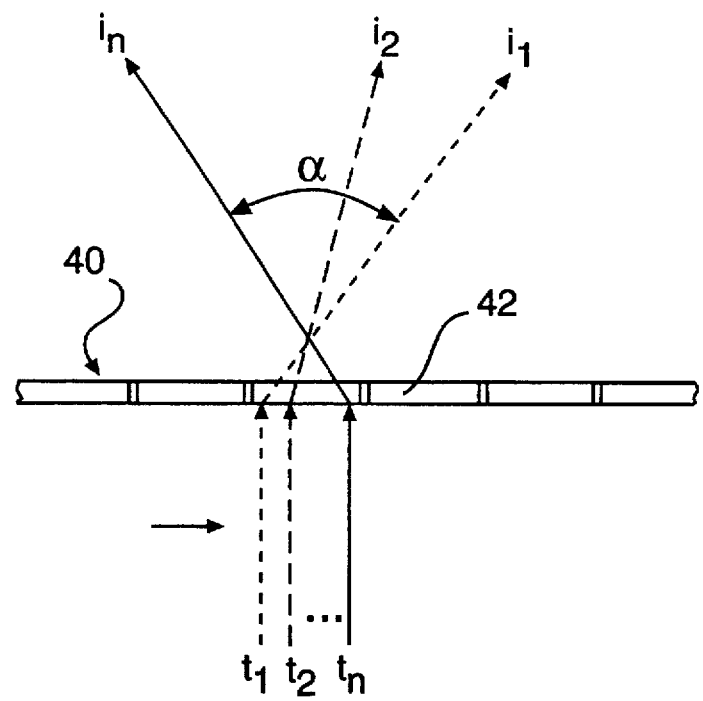
FIG. 14 is a schematic top view of a part of the light emitting surface, illustrating a mode of function of an optical element arranged in a pixel of the light emitting surface.

FIG. 14 illustrates the function of another kind of light emitting surface 40. The deflection system provides parallel displacement of the laser beam striking the pixels, so that each relative position of the striking laser beam within a pixel 42 corresponds to one of the view directions $i_1 \ldots i_n$. The laser beam striking a given point of the optical element 44 in a pixel 42 at the moment $t_k$ will be deflected by the optical element in a direction 44 $i_k$ corresponding to the point of incidence. As the point of incidence moves along the surface of the optical element 44 in a pixel, the emitted laser beam sweeps along the whole field of view α. Here the optical elements are convergent optics, while the similar system of FIG. 4 comprises divergent optical elements.

Figure 15:
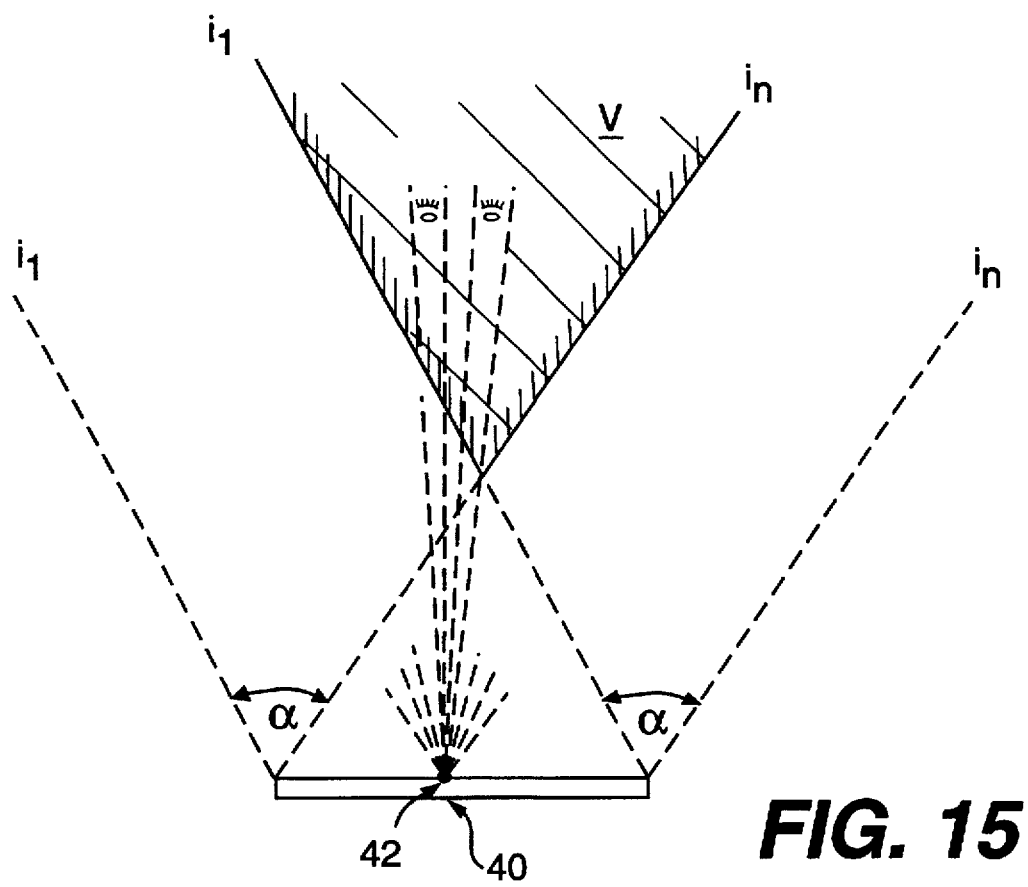
FIG. 15 is a schematic top view of a light emitting surface, illustrating a three dimensional visual field achieved by the invention.

FIGS. 15 and 16 illustrate the formation of the field V of full three-dimensional visual image. The field V is considerably ider in case of FIG. 16, where an arcuate, concave shaped light emitting surface 41 is employed. Similar feature can be simulated more practically by use of a plane screen having pixels with changing properties.

Referring now to FIGS. 18A and 18B, an example of a three dimensional TV set, carried out as a preferred embodiment of the apparatus according to the invention. The television receiver apparatus 12 comprises a closed box having a front face realizing a screen-like light emitting surface 40. Inside the closed box there is arranged focusing scanner mirror optics 14 to reflect a modulated laser beam into the pixels of said light emitting surface 40. In the bottom part of the closed apparatus there is arranged a multicolour laser and modulator unit 20 and deflection units of a deflection system 30. The apparatus can be used as a three-dimensional video or computer monitor with a 3D video input or as a television receiver with a 3D television signal/arial input.

Figure 17A:
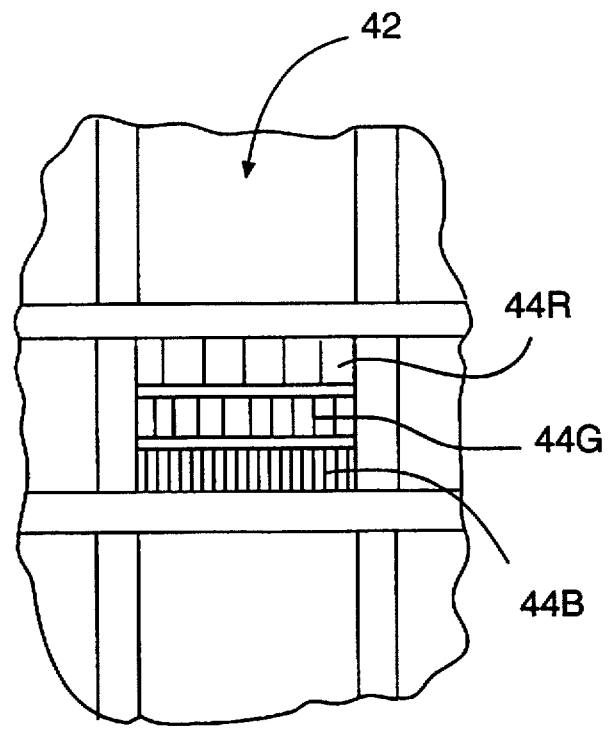
FIG. 17A is an enlarged front view of a pixel of the light emitting surface of the apparatus of FIG. 17.
Figure 17:
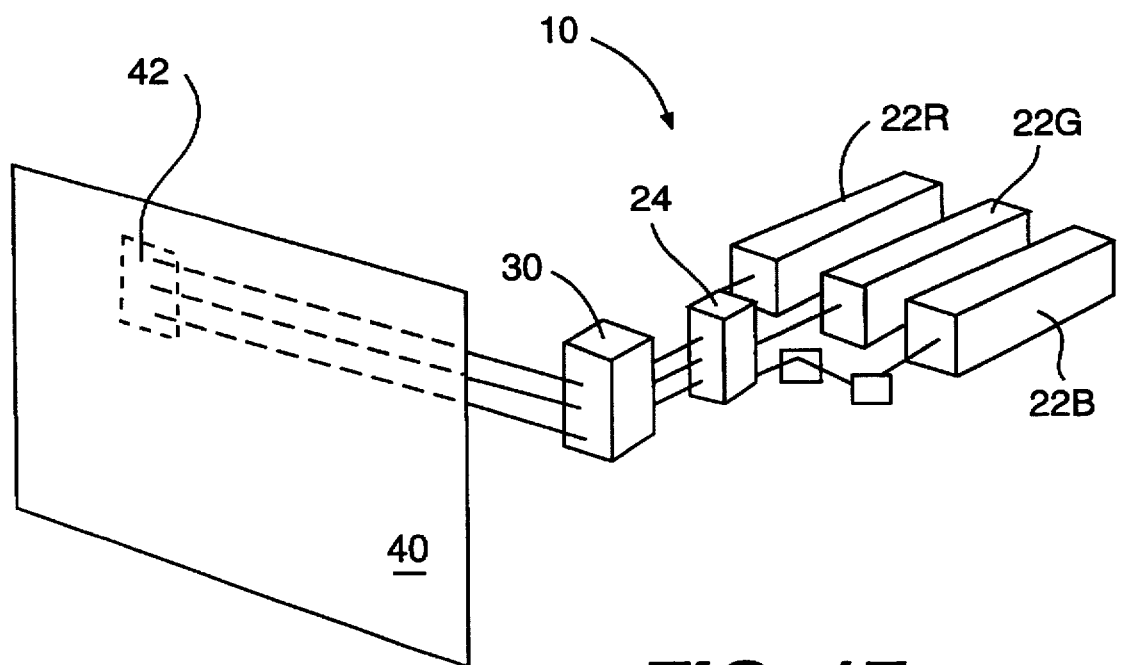
FIG. 17 is a schematic diagram of a preferred embodiment of the invention providing three dimensional colour picture.

FIGS. 17 and 17A show by way of example only the principle of a three-dimensional colour monitor accomplished according to the invention. The colour apparatus comprises at least three laser sources 22R, 22G and 22B, each of different basic wavelength (red, green and blue). In the pixels 42 there are arranged above each other three deflecting optical elements 44R, 44G and 44B for each laser beam of different colour, to form and emit a light beam of definite colour to the corresponding directions.

In a preferred embodiment the width of the optical elements 44R, 44G and 44B is about 0.5 mm, while their height is about 0.15 mm. Optical elements 44R, 44G and 44B are preferably realized by holographic optical elements.

FIGS. 19a and 19b illustrate a picture recording apparatus for producing a 3D video signal without vertical parallax, as shown in FIG. 20B. The apparatus comprises a number of 2D recording cameras C1, C2 ... Cn, e.g. CCD chips with optical supplement arranged next to each other in horizontal plane in a fixed mutual position, in accordance with the view directions of the displaying system, in a similar way as stereograms are recorded. The number of said cameras is equal to the number n of the view directions. Pictures of a spatial figure or scene are taken by the cameras C1, C2 ... Cn simultaneously from different view directions, and the 2D video signals recorded by the 2D cameras are subsequently ordered in a pre-defined way to achieve a 3D video signal format. During recording a virtual screen, marked by reference numeral 1 shall be considered, the relative position of which corresponding to that of the light emitting surface of the 3D display system, as illustrated in FIGS. 19b and 19c, respectively. FIG. 19c demonstrates that the light signal received from a same point of the light emitting surface 40 by the left eye L of a viewer is different from the light signal received by the right eye R.

Figure 21:
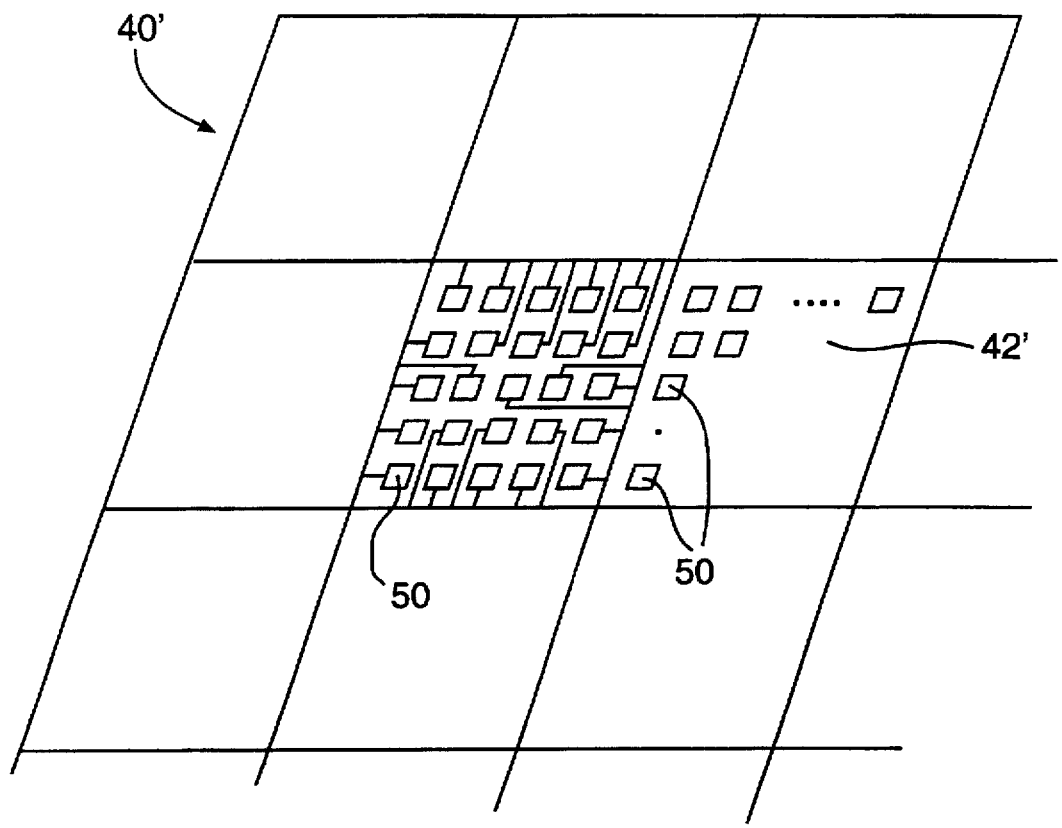
FIG. 21 is a schematic perspective view of a part of an embodiment of the light emitting surface of a further embodiment of the invention.
Figure 22:
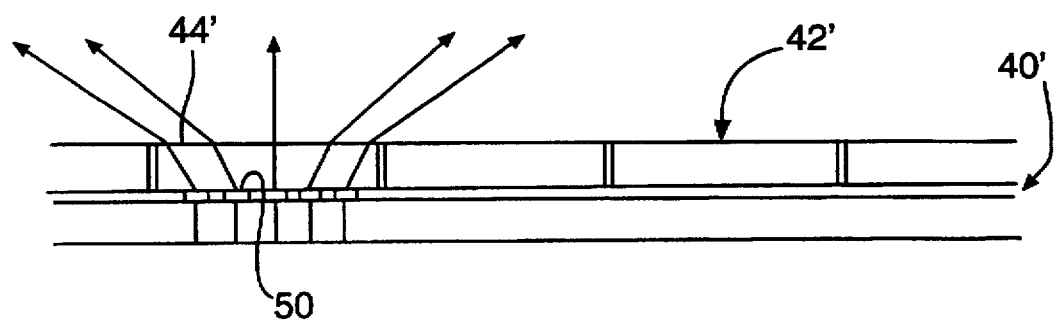
FIG. 22 is a schematic top view of pixels of the light emitting surface of FIG. 21.

FIG. 21 and 22 illustrate the principle and function of a further way of carrying out the invention. In a light emitting surface 40' comprising pixels 42, there is a number of spatially coherent elementary light sources, preferably elementary lasers 50 arranged in each pixel 42'. The elementary lasers 50 are controlled to emit light signals to each direction of the field of view. In a preferred embodiment each elementary laser 50 of a pixel 42' belongs to a defined view direction, being controlled by a 3D video signal to emit laser beam of corresponding intensity and colour to the related direction.

In another possible embodiment the elementary lasers 50 are mutually arranged so that the distances between adjacent elementary lasers 50 fall in the order of magnitude of light wavelength. In this case the elementary lasers 50 are controlled simultaneously in a holographic way, so that the light beams emitted by said elementary sources interfere with each other to provide light beams of corresponding intensity and colour to each direction, according to the 3D video signal control. Such holographic control programs are known per se.

FIG. 22 shows that the direction of the light beams emitted by the elementary lasers 50 can be deflected to meet the desired view direcions by means of optical elements 44', locatd in the pixels 42'.

What we claim is:

1. A method for producing a three-dimensional picture, comprising the steps of:
    modulating a coherent light beam by a three-dimensional video signal to obtain light rays containing picture information and each associated with a view direction; and
    directing the modulated light beam to pixels arranged to define a light emitting surface; wherein
    each light ray of the modulated coherent light beam is emitted from an associated pixel in the associated view direction.

2. Apparatus for producing a three-dimensional picture, comprising
    a laser;
    a modulator for modulating laser rays produced by said laser so that the laser rays include picture information, said modulator controlled by a video signal containing three-dimensional picture information;
    a deflecting system for deflecting the modulated laser rays and controlled by a synchronizing signal for the video signal; and
    a light emitting surface composed of pixels in a fixed arrangement, the pixels containing optical elements that deflect and transmit incident laser rays in a plurality of view directions ($i_1, \ldots i_n$) for each said pixel, said view directions defining a given field of view (a), wherein
    said deflecting system is controlled to deflect the modulated laser rays to said pixels.

3. The apparatus claimed in claim 2, wherein said optical elements are passive elements having constant horizontal deflection and definite vertical dispersion in vertical planes.

4. Apparatus for producing a three-dimensional picture, comprising:
    a laser;
    a modulator for modulating laser rays produced by said laser, said modulator controlled by a video signal containing three-dimensional picture information;
    a deflecting system for deflecting the modulated laser rays and controlled by a synchronizing signal of the video signal; and
    a light emitting surface composed of pixels in a fixed arrangement, the pixels containing optical elements that deflect and transmit incident laser rays in a plurality of view directions ($i_1 \ldots i_n$) for each said pixel, said view directions defining a given field of view ($\alpha$), wherein
    said deflecting system is controlled to deflect the modulated laser rays to said pixels and wherein said optical elements of each said pixel are acousto optical elements controlled to emit light in the view directions ($i_1 \ldots i_n$) indicated by a radio frequency generator.

5. Apparatus for producing a three-dimensional picture, comprising:
    a laser;
    a modulator for modulating laser rays produced by said laser, said modulator controlled, by a video signal containing three-dimensional picture information,
    a deflecting system for deflecting the modulated laser rays and controlled by a synchronizing signal of the video signal; and
    a light emitting surface composed of pixels in a fixed arrangement, the pixels containing optical elements that deflect and transmit incident laser rays in a plurality of view directions ($i_1 \ldots i_n$) for each said pixel, said view directions defining a given field of view ($\alpha$), wherein
    said deflecting system is controlled to deflect the modulated laser rays to said pixels and said deflection system further comprises a group of fibreglass elements for each pixel, said fibreglass groups each having a number of fibreglass elements equal to the number (n) of the plurality of directions ($i_1 \ldots i_n$) defining said field of view ($\alpha$), the input end of said fibreglass groups being attached to the output of a deflection unit, the fibreglass elements at the output end of said fibreglass groups adjusted to direct the laser rays to the plurality of view directions.

6. A method for producing a three-dimensional picture, comprising the steps of:
    modulating the intensity of a spatially coherent laser ray by a video signal containing three-dimensional picture information such that the modulated coherent laser ray includes picture information; and
    emitting said modulated laser ray from points of a light emitting surface in a plurality of directions defining a given field of view, the instant value of the intensity of the modulated laser ray emitted from the points of the light emitting surface in any one of said plurality of directions corresponding to the three-dimensional picture information defining the emitted direction.

7. The method of claim 6, wherein the emitting step further includes the step of deflecting the modulated laser ray to the points of the light emitting surface for emission therefrom in the plurality of directions.

8. The method of claim 6, wherein the modulated laser ray is deflected to strike the points of the light emitting surface in such a distinguishing position or at such distinguishing angles of incidence that incident time components of the laser ray are deflected through passive optical elements.

9. The method of claim 6, wherein the modulated laser ray is deflected to the points of the light emitting surface and emitted through active, controlled optical elements located in the pixels.

10. The method of any of claims 6, 8, or 9, wherein said modulated laser ray is directed into the points of the light emitting surface, preferably onto periodical spheric or cylindric-symmetrical refractive or diffractive optical elements arranged in the points of the light emitting surface by use of horizontal and vertical (frame) deflection according to TV standards, the points of the light emitting surface being arranged so as to conform with standard TV picture point configuration.

11. The method of any of claims 6, 8, or 9, wherein the three-dimensional video signal contains no vertical parallax information and wherein said emitted laser rays horizontally sweep along the field of view with a definite vertical dispersion.

12. The method of claim 6, wherein said three-dimensional video signal comprises a plurality of two-dimensional images of a spatial scene, each two-dimensional image corresponding to one of the plurality of directions within the field of view, and the two-dimensional images being arranged subsequently according to said directions to form the three-dimensional video signal.

13. The method of claim 6, wherein said modulated laser ray is deflected to strike the points of the light emitting surface so that an angle of incidence of the laser rays correspond to the plurality the directions.

* * * * *

UNITED STATES PATENT AND TRADEMARK OFFICE
CERTIFICATE OF CORRECTION

PATENT NO.: 5,801,761

DATED: September 1, 1998

INVENTOR(S): Tibor

It is certified that an error appears in the above-identified patent and that said Letters Patent is hereby corrected as shown below:

Title, Page, Item [76], in the Inventors, line 1, "ÜT" should read --út--.

Claim 2, Col. 11, line 60, "($i_i$, ... $i_n$)" should read --($i_i$ .. $i_n$)--.

Claim 2, Col. 11, line 61, "(a)" should read --($\alpha$)--.

Claim 5, Col. 12, line 27, after "controlled", delete ",".

Claim 5, Col. 12, line 28, "information," should read --information;--.

Claim 13, Col. 14, line 16, after "plurality", insert --of--.

Signed and Sealed this

Twenty-ninth Day of December, 1998

BRUCE LEHMAN

*Attest:*

*Attesting Officer*     *Commissioner of Patents and Trademarks*